United States Patent
Keeler et al.

(10) Patent No.: US 9,977,732 B1
(45) Date of Patent: May 22, 2018

(54) SELECTIVE NONVOLATILE DATA CACHING BASED ON ESTIMATED RESOURCE USAGE

(75) Inventors: Stanton MacDonough Keeler, Longmont, CO (US); Steven Scott Williams, Longmont, CO (US); Robert William Dixon, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 289 days.

(21) Appl. No.: 13/076,513

(22) Filed: Mar. 31, 2011

Related U.S. Application Data (63) Continuation of application No. 12/984,574, filed on Jan. 4, 2011, now abandoned.

(51) Int. Cl.
*G06F 12/02* (2006.01)
*G06F 12/0802* (2016.01)

(52) U.S. Cl.
CPC ...... *G06F 12/0246* (2013.01); *G06F 12/0802* (2013.01); *G06F 2212/7203* (2013.01)

(58) Field of Classification Search
CPC ............. G06F 12/0246; G06F 12/0802; G06F 2212/7203
See application file for complete search history.

(56) References Cited

U.S. PATENT DOCUMENTS

| | | | | |
|---|---|---|---|---|
| 5,860,083 A * | 1/1999 | Sukegawa | | 711/103 |
| 2002/0083264 A1* | 6/2002 | Coulson | | 711/112 |
| 2006/0277360 A1* | 12/2006 | Sutardja et al. | | 711/113 |
| 2008/0059694 A1* | 3/2008 | Lee | | 711/103 |
| 2008/0215800 A1* | 9/2008 | Lee | G06F 3/0613 | 711/103 |
| 2009/0193182 A1* | 7/2009 | Nitta | G06F 3/0611 | 711/103 |
| 2009/0300269 A1* | 12/2009 | Radke et al. | | 711/103 |
| 2010/0095053 A1* | 4/2010 | Bruce et al. | | 711/103 |
| 2010/0169540 A1* | 7/2010 | Sinclair | G06F 12/0246 | 711/103 |
| 2010/0169541 A1* | 7/2010 | Freikorn | G06F 12/0246 | 711/103 |
| 2010/0274962 A1* | 10/2010 | Mosek et al. | | 711/113 |
| 2010/0281230 A1* | 11/2010 | Rabii et al. | | 711/165 |
| 2011/0138112 A1* | 6/2011 | Chiang et al. | | 711/103 |
| 2011/0238887 A1* | 9/2011 | Bazzani | | 711/103 |
| 2012/0017034 A1* | 1/2012 | Maheshwari et al. | | 711/103 |

* cited by examiner

*Primary Examiner* — Arpan P. Savla
(74) *Attorney, Agent, or Firm* — Cesari & Reed, LLP; Kirk Cesari (57) ABSTRACT

The disclosure is related to systems and methods of nonvolatile data caching. In some embodiments, circuits or methods may be configured to store selected data to a nonvolatile data cache based on selection criteria. The selection criteria may be based on previous data access commands. The selection criteria may relate an amount of resources, such as time or power, needed to retrieve the selected data from a data storage medium. The selected data may be retrieved from the data storage medium and stored at the nonvolatile data cache during an idle state.

16 Claims, 4 Drawing Sheets

SELECTIVE NONVOLATILE DATA CACHING BASED ON ESTIMATED RESOURCE USAGE

CROSS-REFERENCE TO RELATED APPLICATION

The present application is a continuation of and claims priority of U.S. patent application Ser. No. 12/984,574 filed on Jan. 4, 2011.

BACKGROUND

The present disclosure is generally related to data caching in a nonvolatile data storage medium.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
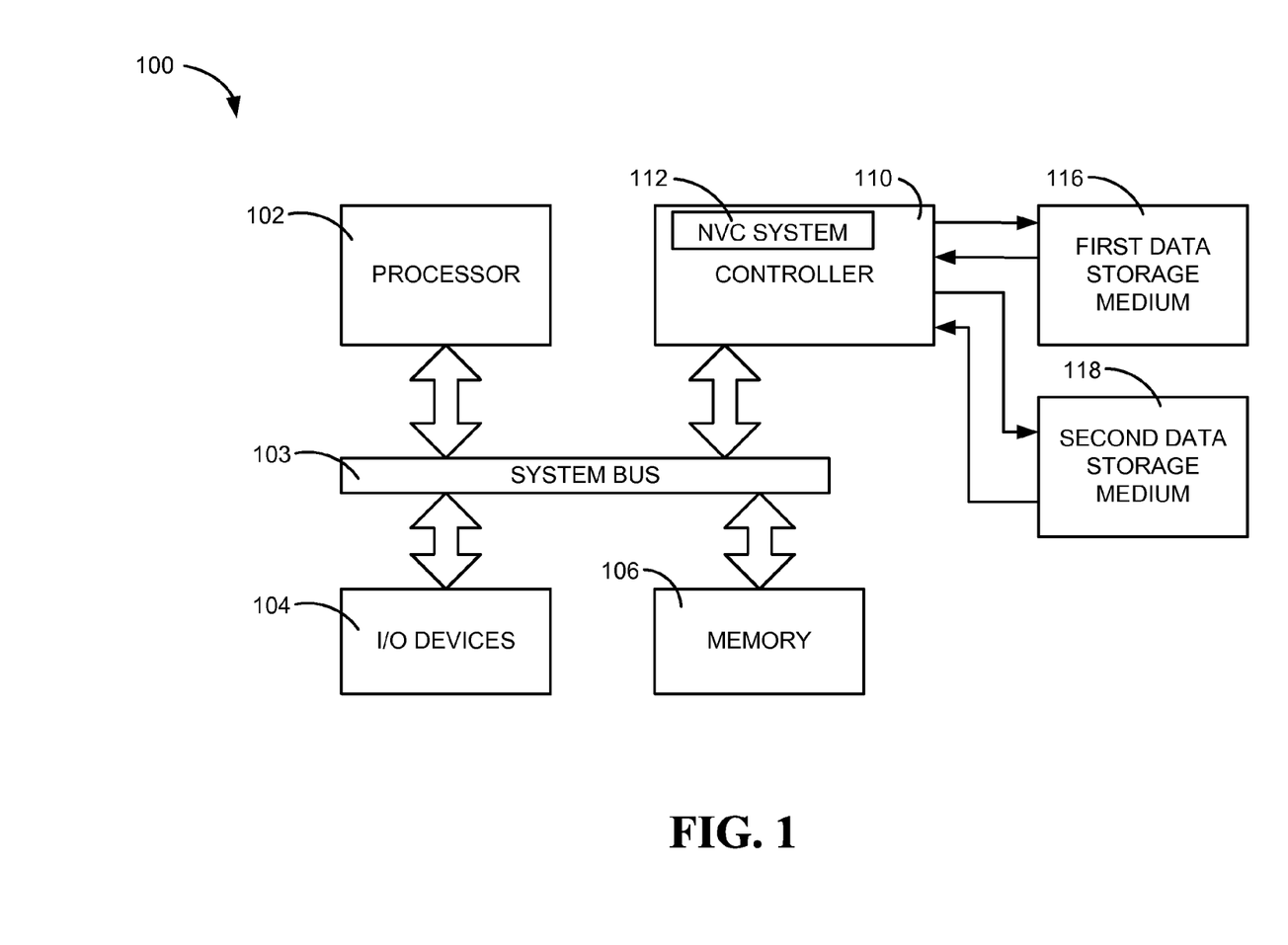
FIG. 1 is a diagram of an illustrative embodiment of a system for nonvolatile data caching.

Referring to FIG. 1, a particular embodiment of a system for nonvolatile data caching is shown and generally designated 100. The system 100 can be a desktop computer, a laptop computer, a server, a personal digital assistant (PDA), a telephone, a music player, another electronic device, or any combination thereof The system 100 may also be referred to as a host or host computer. The system 100 may include a processor 102, that may be a central processing unit (CPU), controller, digital signal processor, reduced instruction set computer (RISC), application specific integrated circuit (ASIC), and the like, or any combination thereof Although shown with one processor 102, the system 100 may include multiple processors. The processor 102 may be connected to a system bus 103 which also can be connected to input/output (I/O) devices 104, such as a keyboard, monitor, modem, storage device, or pointing device. The system bus 103 may also be coupled to a memory 106, which may be a random access volatile memory or nonvolatile memory, such as dynamic random access memory (DRAM). The system bus 103 may also be coupled to a controller 110, either directly or indirectly through an interface circuit (not shown). The controller 110 may include a nonvolatile cache management system 112 adapted to implement nonvolatile data caching.

The system 100 may also contain a first data storage medium 116 and a second data storage medium 118. In a particular embodiment, the first data storage medium 116 and the second data storage medium 118 are both nonvolatile memory and different types of memory, that is the first data storage medium 116 and the second data storage medium 118 do not have identical data storage characteristics and physical construction. For example, the first data storage medium 116 may be a solid state nonvolatile memory, such as a Flash memory, and the second data storage medium 118 may be a disc data storage medium, such as magnetic disc. In another embodiment, both the first data storage medium 116 and the second data storage medium 118 may include multiple integrated circuit memory chips. For example, the first data storage medium 116 may be Multi-Level Cell (MLC) NAND Flash memory or Single-Level Cell (SLC) NAND Flash memory.

The controller 110 may communicate with the processor 102 via an interface (not shown) adapted to receive commands and data from the processor 102. Further, the controller 110 may be configured to implement the nonvolatile cache management system 112 via the controller 110 independent of the processor 102 or any other hardware or function of the system 100. In a particular embodiment, in addition to implementing and managing the nonvolatile cache management system 112, the controller 110 may also be a data storage controller. The controller 110 may comprise a single controller or may be multiple controllers, such as a separate, either functionally or physically, controller for each of the data storage media. In another particular embodiment, the controller 110 can be located in a data storage device that is electrically and physically removable from the system 100 via an interface connector (not shown). Further, the first data storage medium 116 and the second data storage medium 118 may be within or connected to a single housing of one data storage device or may be within separate housing of separate data storage devices. For example, the first data storage medium 116 may be a solid state memory module and the second data storage medium 118 may be a rotating disc drive, where such they are both separately removable from the system 100, such that the solid state memory module is not within the housing of the rotating disc drive or vice versa.

During operation, the processor 102 may send a command to the controller 110 to retrieve or store data. The controller 110 can receive the command from the processor 102 and determine a physical location of data corresponding to a logical block address (LBA) associated with the command via a mapping system (not shown). The controller 110 can also implement the nonvolatile cache management system 112.

The nonvolatile cache management system 112 may include a circuit configured to store selected data, which may be a subset of data stored on the second data storage medium 118, to the first data storage medium 116. The subset of data may be selected based on an amount of resources needed to retrieve the selected data from the second data storage medium 118.

The nonvolatile cache management system 112 may use selection criteria based on statistics of data access commands that were previously received to access data on the second data storage medium 118. The statistics may represent an amount of resources, such as time or power, needed to retrieve the selected data from the second data storage medium 118. Further, the statistics of data access commands that can be used for the selection criteria may include a lowest logical block address (LBA) accessed by a host command, a highest LBA accessed by a host command, a maximum length of any host command, a number of times a host accesses a range of LBAs, any other data access statistic, or any combination thereof. By knowing a difference in LBAs or a frequency of access, an amount of resources needed to access data from the second data storage medium 118 may be determined. The determination may be an approximation or assumption based on past accesses or predetermined.

The selected data may be retrieved from the second data storage medium 118 and stored at the first data storage medium 116 during an idle period of the second data storage medium 118. When the second data storage medium 118, or the system 100, is in an idle period may include when the system 100, or the controller 110, has processing capability to transfer data from the second data storage medium 118 to the first data storage medium 116 with nominal effect on processing commands received from the host processor 102. During the idle period, the controller 110 and the nonvolatile data cache management system 112 can retrieve data corresponding to selected LBAs from the second data storage medium 118 and store the data corresponding to the LBAs in the first data storage medium 116.

The controller 110 may also be coupled to, or incorporate, a search circuit (not shown) that is configured to determine if specific data is stored in the first data storage medium 116. The search circuit may be discrete hardware, logic gates, a programmable controller, or any combination thereof. The search circuit may comprise electronic circuitry capable of determining which logical block addresses (LBAs) are stored within the first data storage medium 116. The search circuit may also be able to determine if the specific data is stored in other buffers, such as a volatile cache (not shown) or the memory 106.

In some embodiments, the first data storage medium 116 can have a faster access time than the second data storage medium 118. For example, the first data storage medium 116 may be a nonvolatile solid state memory, such as a flash memory, and the second data storage medium may be a disc based data storage medium.

Figure 2:
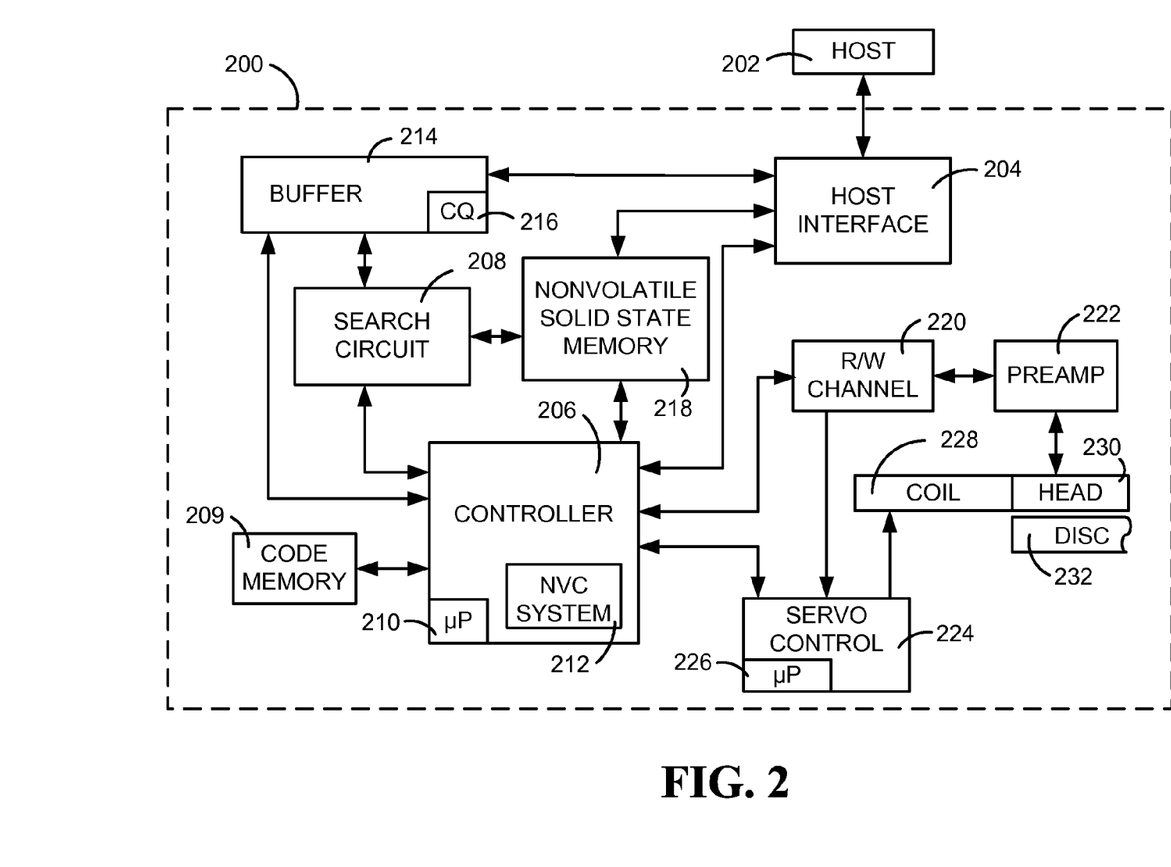
FIG. 2 is a diagram of another illustrative embodiment of a system for nonvolatile data caching.

Referring to FIG. 2, a particular embodiment of a data storage device is shown and generally designated 200. The data storage device 200 may include the controller 206, which may be the controller 110 shown in FIG. 1. The data storage device 200 can communicate with a host device 202 (such as the processor 102 shown in FIG. 1) via an interface 204 that may include a connector that allows the data storage device 200 to be physically removed from the host 202. The interface 204 may include hardware circuits, logic, firmware, or any combination thereof. In a particular embodiment, the interface 204 comprises an interface that allows attachment of a data storage device to another computer system, such as USB, IEEE 1394, Compact Flash, SATA, eSATA, PATA, SCSI, SAS, or Fiber Channel. The data storage device 200 may be internal or external to an enclosure housing the host 202.

The data storage device 200 can include a programmable controller 206 with processor 210. The programmable controller 206 may be coupled to a memory 209 and buffer 214. The memory 209 may be a nonvolatile solid state memory, such as Serial Flash, that is capable of storing firmware code, or boot code, to allow the controller to perform functions of the data storage device 200, such as an initialization or a spin-up sequence for disc(s) 232. The buffer 214 can temporarily store user data during read and write operations and can include a command queue (CQ) 216 where multiple pending access operations can be temporarily stored pending execution. The buffer 214 or CQ 216 may be located in a nonvolatile memory or a volatile memory.

Further, FIG. 2 further shows the data storage device 200 to include a read/write (R/W) channel 220 which encodes data during write operations and reconstructs user data retrieved from disc(s) 232 during read operations. Disc(s) 232 may be at least one magnetic data storage disc, optical data storage disc, or magneto-optical data storage disc. A preamplifier/driver circuit (preamp) 222 applies write currents to the head(s) 230 and provides pre-amplification of readback signals. A servo control circuit 224 uses servo data to provide the appropriate current to the coil 228 to position the head(s) 230. The controller 206 can communicate with a processor 226 to move the head(s) 230 to the desired locations on the disc(s) 232 during execution of various pending commands from the command queue 216.

The data storage device 200 may also include a nonvolatile solid state memory 218, such as Flash Memory. In some embodiments, the nonvolatile solid state memory 218 may be NAND Flash Memory. Further, the data storage device 200 may also include, a nonvolatile cache management system 212, which may be firmware or circuits internal (as shown) to the controller 206 or a separate circuit external (not shown) to the controller 206. The nonvolatile cache management system 212 may include logic, circuits, or instructions to perform nonvolatile data caching for the data storage device 200. For example, the nonvolatile cache management system 212 may use a portion or all of the nonvolatile solid state memory 218 as a nonvolatile data cache.

The data storage device 200 may also include a search circuit 208. The search circuit 208 may include circuits, logic, software, or any combination thereof. Further, the search circuit 208 may be internal or external to another controller, such as the data storage controller 206, within the data storage device 200. The search circuit 208 can be configured to determine when data, such as data corresponding to a read request from the host 202, is stored in a buffer, such as the buffer 214 and the nonvolatile solid state memory 218. If the search circuit 208 determines at least one of the buffers includes the requested data, the data storage device 200 can transfer the data from the respective buffer to the host without a need for the disc(s) 232 to be accessed to complete the read request from the host 202. The search circuit may determine which data is in the buffer(s) by performing an LBA search on an LBA mapping system associated with the buffers.

During operation, the interface 204 can receive data storage commands, such as read or write commands, from the host 202, which may be stored, at least temporarily, in the buffer 214 and command queue 216. During operation of the data storage device 200, the controller 206 may store statistics (such as information about past read requests) for each buffer segment created in a buffer. The buffer segments can store data retrieved from the disc(s) 232, at least temporarily, to allow the controller 206 and interface 204 to send requested data to the host 202.

The nonvolatile cache management system 212, which may be part of or separate from the controller 206, may determine a list of logical block addresses (LBAs) to store in a buffer of the nonvolatile solid state memory 218. The list of LBAs may be LBAs selected from LBAs stored on the disc(s) 232 based on selection criteria. The selection criteria may include an amount of resources that may be consumed (such as physical activity, power, time, noise, or any combination thereof) when retrieving the data associated with a respective LBA from the disc(s) 232.

In a particular embodiment, historical data may be stored based on past read requests. The historical data may be used to determine a relative amount of resources that may be consumed, such as relatively approximated by variances between accessed LBAs, which variances may be used as the selection criteria to determine the LBAs selected to be put in the list of LBAs. For example, the historical data may record information attributed via a recently active buffer segment, which may include a lowest logical block address (LBA) accessed by a host command, a highest LBA accessed by a host command, a maximum length of any host command, a number of times a host accesses a range of LBAs, any other data access statistic, or any combination thereof.

When the nonvolatile cache management system 212 has created the list of LBAs to be stored in the nonvolatile solid state memory 218, the controller 206 may determine when the data storage device 200 is in an idle state, then transfer data associated with the selected LBAs that are identified in the list of LBAs from the disc(s) 232 to the nonvolatile solid state memory 218. The nonvolatile solid state memory 218 can then act as read buffer to service requests from the host. An idle state can include when the data storage device 200, or the controller 206, has processing capability to transfer data from the disc(s) 232 to the nonvolatile solid state memory 218 with nominal effect on processing commands received from the host 202. This may occur when the data storage device has no pending commands in the command queue or when pending commands do not require the disc(s) 232 to be read or written. During the idle state, the controller 206 can retrieve data corresponding to the LBAs in the list from the disc(s) 232 and store the data corresponding to the LBAs in the list in the nonvolatile solid state memory 218. An LBA mapping system (not shown) may be updated to indicate the LBAs stored in the the nonvolatile solid state memory 218 may be retrieved from the nonvolatile solid state memory 218.

The controller 206 may also coalesce potential LBAs to include in the list of LBAs, that is, the controller 206 may include a single starting LBA and range in the list where the single starting LBA and range includes at least one other LBA candidate from the historical stored LBA access data. The controller 206 can determine if data corresponding to logically proximate LBAs could be beneficial to be added to the LBAs stored in the nonvolatile solid state memory 218. For example, potential LBAs may be added to a range of LBAs to be stored in the nonvolatile solid state memory 218 when a separation between any two LBA candidates is less than ninety-seven (97) LBAs. For instance, a starting LBA and a second LBA may be only a range of twenty (20) away from each other, then instead of storing both LBAs separately in nonvolatile solid state memory 218, the controller 206 can store the first LBA and the range of twenty (20) LBAs, which include the second LBA. The coalescing may be done when the data storage device 200, or the controller 206, is in an idle state.

Figure 3:
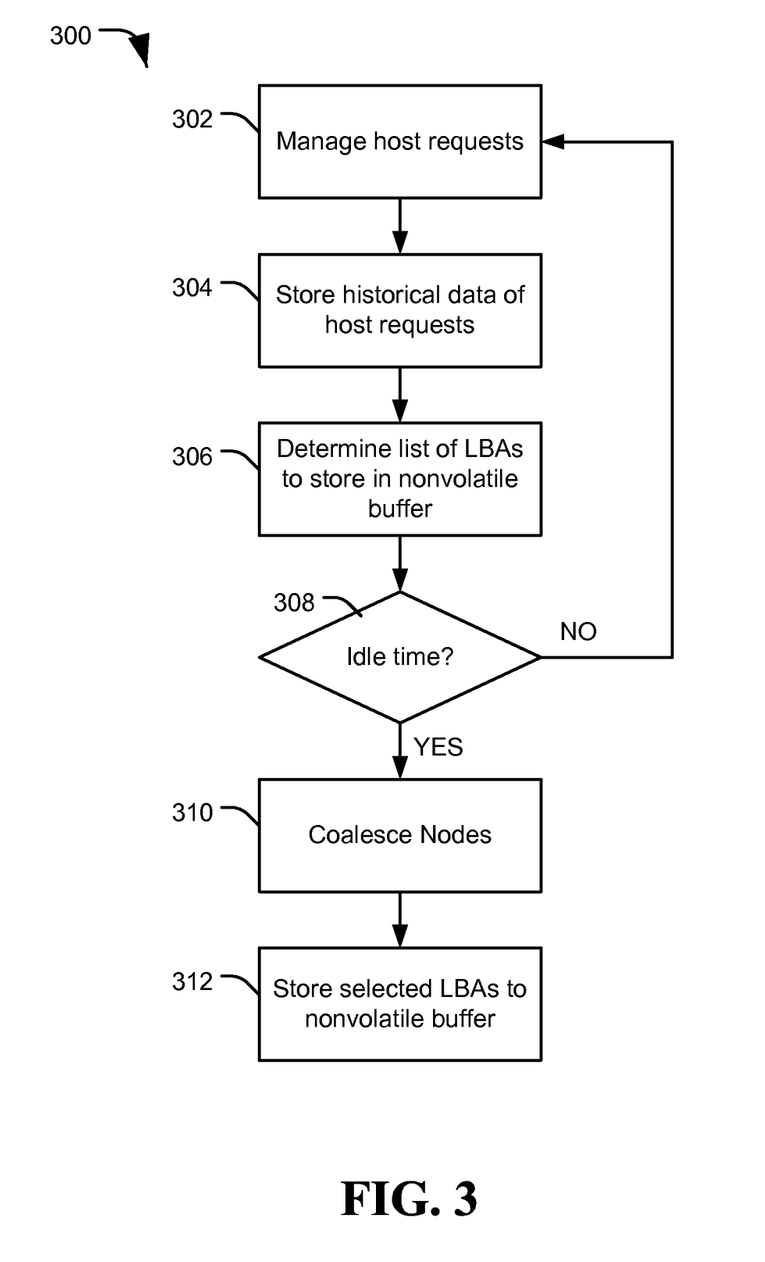
FIG. 3 is flowchart of an illustrative embodiment of a method for nonvolatile data caching.

Referring to FIG. 3, a flowchart of an illustrative embodiment of a method for nonvolatile data caching is shown and generally designated 300. The method 300 can include managing host requests, at 302. The host requests may include read or write requests, as well as other host requests.

When a read request is received, a controller may allocate a buffer segment, creating an active buffer segment, in a memory, such as the buffer memory 214 shown in FIG. 2, to service the read requests. The buffer segment can actively transfer data from another memory, such as the disc(s) 232, through the active buffer segment to a host. A buffer segment may become an inactive buffer segment when the host read requests associated with the respective buffer segment have been terminated. An inactive buffer segment may hold valid data until the buffer segment is de-allocated (i.e. the buffer space is not allocated for read or write active or inactive segments).

When the host requests data (which may be via a read request indicating an LBA range), the controller can search the active buffer segment, any inactive buffer segments, and the nonvolatile data cache, such as the nonvolatile solid state memory 218 shown in FIG. 2, for the data associated with the host request. If the data requested by the host is not in any buffer segment or the nonvolatile cache, an active buffer segment can be allocated to transfer the associated data to the host.

The method 300 may also include maintaining statistics, or historical data, for each buffer segment, at 304. The statistics may be stored during or after a host request is processed. In one embodiment, the statistics are maintained at least through the time a buffer segment is an inactive segment to when the inactive segment is de-allocated. For example, for each buffer segment, the historical data may include a lowest logical block address (LBA) accessed by a host command, a highest LBA accessed by a host command, a maximum length of any host command, a number of times a host accesses a range of LBAs, any other data access statistic, or any combination thereof.

Further, the method 300 may include determining a list of LBAs to store in a nonvolatile data cache, at 306. The LBAs to include in the list may be determined by analyzing at least one of the stored statistics for each buffer segment. For example, a controller may examine the statistics for a buffer segment to determine a range between two accessed LBAs and add an LBA range to the list when the range is within a certain size. The range size can indicate a relative amount of resources needed to retrieve the associated data from a data storage medium, such as access time or number of revolutions of a data disc. Other methods, such as those described herein, may be used to determine which LBAs to store in the nonvolatile data cache.

When the list of LBAs has been created, the method 300 may determine when the data storage device is in an idle state, at 308. If the data storage device is not in an idle state, then the method can process host commands, at 302. If the data storage device is in an idle state, then the method 300 may coalesce nodes (i.e. combine potential LBA candidates) based on determined criteria, at 310. Then, the method 300 may transfer data associated with the selected LBAs, which are identified in the list of LBAs, from a data storage medium, such as the disc(s) 232 shown in FIG. 2, to the nonvolatile data cache, which may be the solid state memory 218 shown in FIG. 2, at 312. The nonvolatile data cache can then act as read buffer to service requests from the host, without requiring another data storage medium, such as the disc(s) 232 shown in FIG. 2, to be activated for the LBAs stored in the nonvolatile data cache.

A data storage device may be in an idle state when the data storage device, or a controller or processor thereof, has processing capability to transfer data from the data storage medium to the nonvolatile data cache with nominal effect on processing commands received from the host. For example, an idle state may be triggered when there are no pending commands in a command queue, there is less than a threshold level of commands in a command queue, a host has not sent a command for a certain period of time, there are no pending commands that require a read or write action, a notification from a host to enter an idle state, a power on or power loss event, or any combination thereof.

Coalescing nodes (i.e. combining potential LBA candidates into one entry in a list of LBAs) may include determining LBA candidates to include in the list of LBAs. When LBA candidates are coalesced, the list may include a single starting LBA and a range where the single starting LBA and the range includes at least one other LBA candidate. LBA candidates may be determined from the historical statistics of each buffer segment or by other means. Further, the method 300 can determine if data corresponding to logically proximate LBAs could be beneficial to be added to the LBAs stored in the nonvolatile data cache. For example, candidate LBAs may be added to a range of LBAs to be stored in the nonvolatile data cache when a separation between any two LBA candidates is less than ninety-seven (97) LBAs. For instance, a first LBA candidate and a second LBA candidate may be only a range of twenty (20) away from each other, then instead of storing both LBA candidates separately in the nonvolatile data cache, the method 300 can store the first LBA with a range of twenty (20) LBAs, which include the second LBA candidate.

Figure 4:
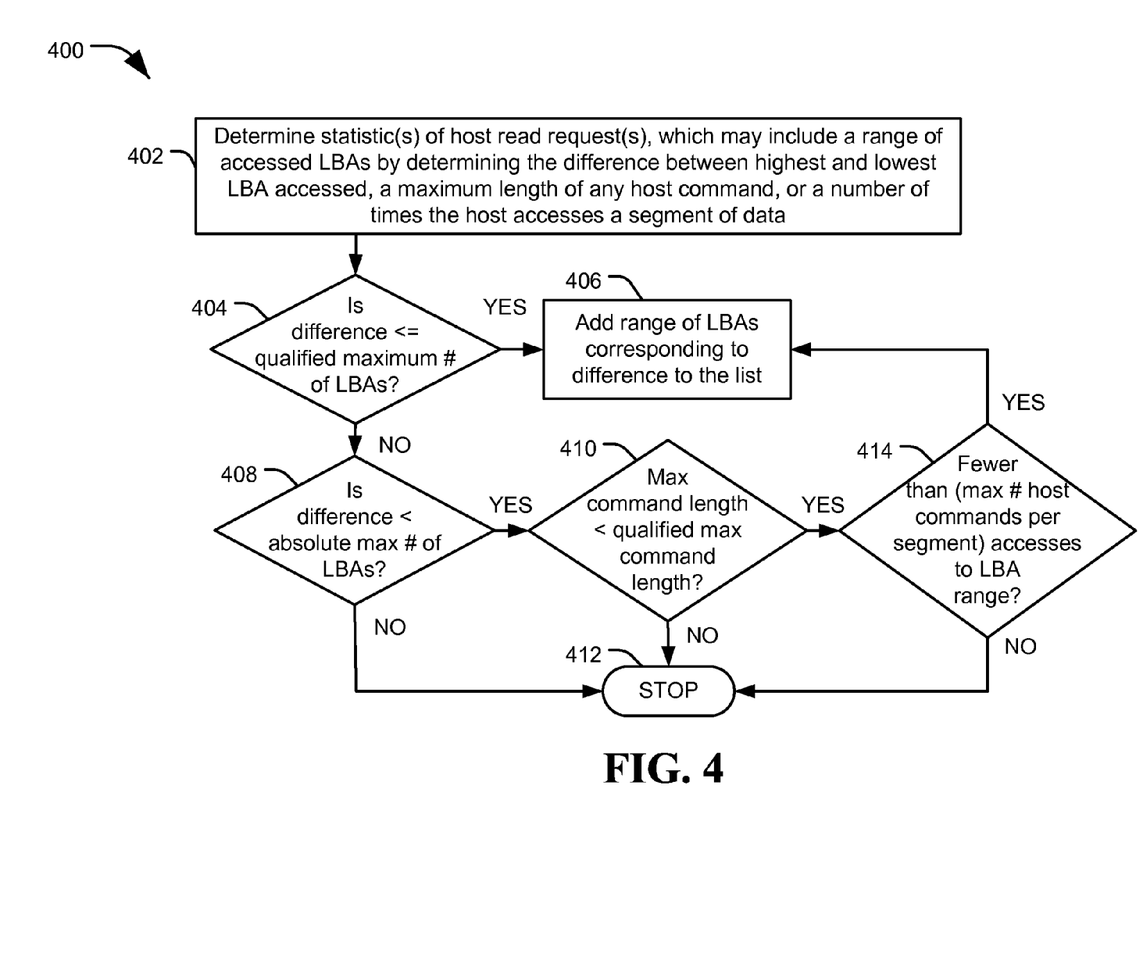
FIG. 4 is flowchart of an illustrative embodiment of a method for nonvolatile data caching.

Referring to FIG. 4, a flowchart of an illustrative embodiment of a method for nonvolatile data caching is shown and generally designated 400. The method 400 may be used as selection criteria to determine when to accept a candidate LBA (add it to a list of LBAs) to have the data associated with accepted LBAs stored in a nonvolatile data cache, such as nonvolatile solid state memory 218 shown in FIG. 2. Storage of selected LBAs in the nonvolatile data cache can allow for faster data access to the selected LBAs. Also, less system resources may be used to access the selected LBAs once their respective data is stored in the nonvolatile data cache. This can lead to a faster response time for read requests for the LBAs stored in the nonvolatile data cache. Thus, in one embodiment, LBA accesses that consume a relatively long time period to execute, or which take relatively more power to execute, may be stored in the nonvolatile data cache.

The method 400 may include determining at least one statistic of at least one host read request, at 402. The at least one statistic may include a range of accessed LBAs by determining a difference between a highest and a lowest LBA accessed, a maximum length of any host command, a number of times the host accesses a segment of data, or any combination thereof.

The difference may be determined if it is less than or equal to a qualified maximum number of LBAs (e.g. 512 LBAs), at 404. If the difference is less than the qualified maximum number of LBAs, then the range of LBAs corresponding to the difference is stored in the accepted LBA list to be stored to the nonvolatile data cache, at 406. If the difference is greater than the qualified maximum number of LBAs, then the difference may be determined if it is less than an absolute maximum number of LBAs (e.g. 1024 LBAs), at 408. If the difference is not less than the absolute maximum number of LBAs, then the method 400 stops, at 412, and the LBA range represented by the difference is not added to accepted LBA list.

When the difference is less than the absolute maximum number of LBAs, then the method 400 may determine if the maximum length of any host command is less than a qualified maximum command length (e.g. 64 LBAs), at 410. When the maximum length is not less than the qualified maximum command length, then the method 400 stops, at 412, and the LBA range represented by the difference is not added to the accepted LBA list. When the maximum length is less than the qualified maximum command length, then the method 400 may determine if there have been fewer than a maximum number of host commands accessed per segment (e.g. sixteen (16)) to the LBA range of the difference, at 414. When there have not been fewer than the maximum number of host commands accessed per segment, the method 400 stops, at 412, and the LBA range represented by the difference is not added to accepted LBA list. When there have been fewer than the maximum number of host commands accessed per segment, then the range of LBAs corresponding to the difference is stored in the accepted LBA list to be stored to the nonvolatile data cache, at 406. The method 400, including the numbers used for the decision points, may be optimized based on a cache size, a speed of the cache, and a host workload.

In another embodiment, a skip sequential enhancement may be implemented where smaller individual ranges may be candidates for the LBA list when a range of LBAs in-between the smaller ranges is skipped. For example, if a read request is processed for LBA 20, length 10, LBA 10 length 1, then skips to LBA 500, length 10, then to LBA 700, length 10; three candidates may be selected to be added to the list from this example: LBA 10, length 20, LBA 500, length 10, and LBA 700, length 10.

In accordance with various embodiments, the methods described herein may be implemented as one or more software programs running on a computer processor or controller, such as the processor 102, the controller 110, or the controller 206. Further, a computer readable medium may store instructions, that when executed by a processor or computer system, cause the processor or computer system to perform the methods described herein. Dedicated hardware implementations including, but not limited to, application specific integrated circuits, programmable gate arrays, and other hardware devices can likewise be constructed to implement the methods described herein. The systems and methods described herein can be applied to any type of data storage system that could use a nonvolatile data cache.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

The illustrations and examples provided herein are but a few examples of how the present disclosure can be applied to data storage systems. There are many other contexts in which the methods and systems described herein could be applied to computing systems and data storage systems. For example, the methods and systems described herein are particularly useful for computing systems and data storage devices having more than one type of non-volatile memory, such as when the computing systems or the data storage devices have at least two non-volatile data stores that are not identical in storage characteristics and physical construction.

Another system in which the examples discussed herein could be useful can include a computer system where a first non-volatile memory and a second non-volatile memory are physically separate devices, (e.g. separately removable from the computer system), yet they are managed, such as by a processor of the computer system or a controller of one of the data storage devices, to implement the methods and systems described herein. In a particular embodiment, a first nonvolatile memory of a first type may be directly connected to a motherboard (where a CPU of the computer system resides) and a second nonvolatile memory of a second type may also be directly connected to the motherboard. A controller or processor on the motherboard may manage the data storage operations for the first nonvolatile memory, the second nonvolatile memory, or any combination thereof. Further, each data storage device may include a separate controller or processor to manage the data storage operations for their respective data storage media. Even further, a controller or processor within one of the data storage devices containing one of the nonvolatile memories may manage data storage operations for both the first and second nonvolatile memories. Both the first and the second nonvolatile memories may be user-removable from the motherboard in the form of a connector, may be semi-permanently connected to the motherboard, such as via a circuit board or direct wiring with no user-removable connector, or any combination thereof In other embodiments, a first nonvolatile memory of a first type may be directly connected to the motherboard and a second nonvolatile memory of a second type may be directly connected to the first nonvolatile memory. The first nonvolatile memory and the second nonvolatile memory may both be in a single enclosure or may be in two separate enclosures, each of which may be user-removable from the computer system and each other. In such embodiments, a controller or processor of the first nonvolatile memory may manage the data storage operation of the second nonvolatile memory.

In further embodiments, a nonvolatile command queue may be particularly useful to receive data storage commands from a host. The nonvolatile command queue may be located within a first data storage device, a second data storage device, on a motherboard, or any combination thereof. Further, the nonvolatile command queue may be implemented within any memory structure that is nonvolatile and can be used for queuing commands.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a controller configured to:
     determine, during operation of the device, statistics of host read requests, the statistics indicating a relative amount of resources that could be consumed when retrieving data associated with specific logical block addresses (LBAs) from a second nonvolatile memory;
     store the statistics;
     determine the relative amount of resources based on the statistics;
     select a set of LBAs to store in a nonvolatile cache of a first nonvolatile memory based on the determined relative amount of resources, where the second nonvolatile memory is not the first nonvolatile memory;
     add the set of LBAs to a list of candidate LBA ranges to store to the nonvolatile cache from the second nonvolatile memory;
     determine when the device is in an idle state; and
     when the device is in the idle state, retrieve specific data corresponding to a selected candidate LBA range from the list of candidate LBA ranges from the second nonvolatile memory and store the specific data to the nonvolatile cache, the nonvolatile cache configured to act as a buffer for the second nonvolatile memory
   wherein the statistics comprise:
     a lowest logical block address (LBA) accessed by a host command;
     a highest LBA accessed by a host command; the controller is further configured to:
     determine a difference between the highest LBA accessed and the lowest LBA accessed corresponding to a range of LBAs;
     when the difference is less than a first threshold number of LBAs, add the range of LBAs to the list of candidate LBA ranges;
     when the difference is greater than the first threshold number, determine if the difference is less than a second threshold number of LBAs, where the second threshold number of LBAs is greater than the first threshold number of LBAs;
     when the difference is not less than the second threshold number of LBAs, do not add the range of LBAs to the list of candidate LBA ranges;
     when the difference is less than the second threshold number of LBAs, determine if a host command length is less than a threshold command length;
     when the host command length is not less than the threshold command length, do not add the range of LBAs to the list of candidate LBA ranges;
     when the host command length is less than the threshold command length, determine if there are fewer than a threshold number of host accesses to the range of LBAs;
     when there are not fewer than the threshold number of host accesses, do not add the range of LBAs to the list of candidate LBA ranges; and
   when there are fewer than the threshold number of host accesses, add the range of LBAs to the list of candidate LBA ranges.

2. The device of claim 1, the controller further configured to:
   coalesce LBAs between a first candidate LBA range on the list of candidate LBA ranges and a second candidate LBA range on the list of candidate LBA ranges into a combined candidate LBA range; and
   add the combined candidate LBA range to the list of candidate LBA ranges.

3. The device of claim 2, wherein the controller is further configured to:
   determine if the first candidate LBA range is within a threshold number of LBAs from the second candidate LBA range;
   coalesce the LBAs when the first candidate LBA range is less than a predetermined number of LBAs from the second candidate LBA range.

4. The device of claim 1, wherein the statistics comprise:
   a maximum length of any host command; and
   a number of times a host accesses a range of LBAs.

5. The device of claim 1, further comprising:
   a buffer memory including a queue for pending commands; and
   a search circuit configured to determine if the requested data is in the buffer memory and the nonvolatile cache.

6. The device of claim 1, further comprising:
an interface configured to receive a read request from a host;
the first nonvolatile memory;
the second nonvolatile memory, wherein the first nonvolatile memory has a faster read access time than the second nonvolatile memory; and
the controller configured to send data associated with the set of LBAs from the nonvolatile cache to the host in response to the read request, where the controller does not access the second nonvolatile memory to retrieve data associated with LBAs identified by the read request that are stored in the nonvolatile cache.

7. The device of claim 6, wherein the first nonvolatile memory is a solid state memory and the second nonvolatile memory is a rotating memory.

8. A device comprising:
a circuit configured to:
  determine, during operation of the device, a relative amount of resources that could be consumed when retrieving specific data from a second nonvolatile memory;
  select data based on the relative amount of resources;
  determine when the device is in an idle state; and
  when the device is in the idle state, store the selected data to a first nonvolatile data storage medium from a second nonvolatile data storage medium, the first nonvolatile data storage medium configured to act as a non-volatile buffer for the second nonvolatile data storage medium;
  maintain data access statistics for data access requests;
  based on the data access statistics, add a set of logical block addresses (LBAs) assigned to the selected data to a list of candidate LBA ranges to store to the first nonvolatile data storage medium from the second nonvolatile data storage medium; and
  copy a selected candidate LBA range from the list of candidate LBA ranges to the first nonvolatile data storage medium from the second nonvolatile data storage medium;
wherein the data access statistics comprise:
  a lowest logical block address (LBA) accessed by a host command;
  a highest LBA accessed by a host command;
the controller is further configured to:
  determine a difference between the highest LBA accessed and the lowest LBA accessed corresponding to a range of LBAs;
  when the difference is less than a first threshold number of LBAs, add the range of LBAs to the list of candidate LBA ranges;
  when the difference is greater than the first threshold number, determine if the difference is less than a second threshold number of LBAs, where the second threshold number of LBAs is greater than the first threshold number of LBAs;
  when the difference is not less than the second threshold number of LBAs, do not add the range of LBAs to the list of candidate LBA ranges;
  when the difference is less than the second threshold number of LBAs, determine if a host command length is less than a threshold command length;
  when the host command length is not less than the threshold command length, do not add the range of LBAs to the list of candidate LBA ranges;
  when the host command length is less than the threshold command length, determine if there are fewer than a threshold number of host accesses to the range of LBAs;
  when there are not fewer than the threshold number of host accesses, do not add the range of LBAs to the list of candidate LBA ranges; and
  when there are fewer than the threshold number of host accesses, add the range of LBAs to the list of candidate LBA ranges.

9. The device of claim 8, wherein the amount of resources includes a relative time needed to retrieve an LBA from the second data storage medium.

10. A device comprising:
a first nonvolatile memory having a nonvolatile cache to store data retrieved from a second nonvolatile memory;
the second nonvolatile memory;
a controller configured to:
  maintain, during operation of the device, data access statistics for data access requests from a host;
  determine, during operation of the device, a relative amount of resources that could be consumed when retrieving specific data from a second nonvolatile memory, the relative amount of resources based on the data access statistics;
  determine a set of logical block addresses (LBAs) based on the relative amount of resources;
  add the set of LBAs to a list of candidate LBA ranges to store to the nonvolatile cache from the second nonvolatile memory;
  determine when the device is in an idle state; and when the device is in the idle state, copy a selected candidate LBA range from the list of candidate LBA ranges to the nonvolatile cache from the second nonvolatile memory;
wherein the data access statistics comprise:
  a lowest logical block address (LBA) accessed by a host command;
  a highest LBA accessed by a host command; the controller is further configured to:
  determine a difference between the highest LBA accessed and the lowest LBA accessed corresponding to a range of LBAs;
  when the difference is less than a first threshold number of LBAs, add the range of LBAs to the list of candidate LBA ranges;
  when the difference is greater than the first threshold number, determine if the difference is less than a second threshold number of LBAs, where the second threshold number of LBAs is greater than the first threshold number of LBAs;
  when the difference is not less than the second threshold number of LBAs, do not add the range of LBAs to the list of candidate LBA ranges;
  when the difference is less than the second threshold number of LBAs, determine if a host command length is less than a threshold command length;
  when the host command length is not less than the threshold command length, do not add the range of LBAs to the list of candidate LBA ranges;
  when the host command length is less than the threshold command length, determine if there are fewer than a threshold number of host accesses to the range of LBAs;
  when there are not fewer than the threshold number of host accesses, do not add the range of LBAs to the list of candidate LBA ranges; and when there are fewer than the threshold number of host accesses, add the range of LBAs to the list of candidate LBA ranges.

11. The device of claim 10 further comprising:
the data access statistics include a length of LBAs of data requested in a read request; and
the controller further configured to:
    add the set of LBAs when the length is less than a first threshold.

12. The device of claim 11 further comprising:
the data access statistics include a number of read requests to the set of LBAs; and
the controller further configured to:
    when the length is greater than the first threshold and is less than a second threshold and the number of read requests is greater than a read request threshold, add the set of LBAs to the candidate list.

13. The device of claim 11 further comprising:
the controller further configured to:
    determine if LBAs associated with a first data access are within a second threshold number of LBAs from LBAs associated with a second data access; and
    add the set of LBAs including all LBAs between a first LBA associated with the first data access and a last LBA associated with the second data access when LBAs associated with the first data access are within the second threshold number of LBAs from LBAs associated with the second data access.

14. The device of claim 10 further comprising:
the controller further configured to:
    determine if a first candidate LBA range in the list of candidate LBA ranges is within a threshold number of LBAs from a second candidate LBA range in the list of candidate LBA ranges;
    coalesce all LBAs between the first candidate LBA range and the second candidate LBA range into a combined candidate LBA range when the first candidate LBA range is within the threshold number of LBAs from the second candidate LBA range; and
    store the combined candidate LBA range to the nonvolatile cache from the second nonvolatile memory.

15. The device of claim 10 further comprising:
a volatile buffer memory;
the controller further configured to:
    receive a read request from the host requesting specified data;
    check the volatile buffer memory and the nonvolatile cache for the specified data;
    when the specified data is not contained in the volatile buffer memory and not contained in the nonvolatile cache:
        create an active segment in the volatile buffer memory to store the specified data;
        retrieve the specified data from the second nonvolatile memory and store the specified data in the active segment; and
        maintain the data access statistics for the active segment.

16. The device of claim 10 further comprising:
the controller configured to:
add the set of LBAs to the list of candidate LBA ranges based on an amount of resources that could be consumed when retrieving data associated with the set of LBAs from the second nonvolatile memory.

* * * * *